(12) United States Patent
Van Nieuwstadt et al.

(10) Patent No.: US 9,664,095 B2
(45) Date of Patent: May 30, 2017

(54) METHOD AND SYSTEM FOR LEAK DETECTION AT A PARTICULATE FILTER

(71) Applicant: Ford Global Technologies, LLC, Dearborn, MI (US)

(72) Inventors: Michiel J. Van Nieuwstadt, Ann Arbor, MI (US); Joseph Norman Ulrey, Dearborn, MI (US); William Charles Ruona, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 164 days.

(21) Appl. No.: 14/242,709

(22) Filed: Apr. 1, 2014

(65) Prior Publication Data

US 2015/0275738 A1 Oct. 1, 2015

(51) Int. Cl.
| | |
|---|---|
| *G01M 15/10* | (2006.01) |
| *F01N 11/00* | (2006.01) |
| *B01D 46/00* | (2006.01) |
| *B01D 46/30* | (2006.01) |
| *B01D 46/44* | (2006.01) |

(52) U.S. Cl.
CPC ........ *F01N 11/007* (2013.01); *B01D 46/0086* (2013.01); *B01D 46/30* (2013.01); *B01D 46/442* (2013.01); *F01N 11/00* (2013.01); *F01N 2550/00* (2013.01); *F01N 2550/04* (2013.01); *F01N 2560/025* (2013.01); *F01N 2560/14* (2013.01); *Y02T 10/47* (2013.01)

(58) Field of Classification Search
USPC ......................................... 73/114.69, 114.75
See application file for complete search history.

(56) References Cited

U.S. PATENT DOCUMENTS

| | | | |
|---|---|---|---|
| 5,291,673 A | 3/1994 | Hamburg et al. | |
| 6,756,904 B2 * | 6/2004 | Kinugawa et al. | 340/606 |
| 7,487,634 B2 * | 2/2009 | Wakamatsu | 60/297 |
| 8,281,576 B2 * | 10/2012 | Parnin | 60/297 |
| 8,359,839 B2 | 1/2013 | Van Nieuwstadt et al. | |
| 2004/0216614 A1 * | 11/2004 | Schulte et al. | 96/417 |

(Continued)

FOREIGN PATENT DOCUMENTS

| | | |
|---|---|---|
| EP | 0844380 A2 | 5/1998 |
| EP | 2690263 A1 | 1/2014 |

OTHER PUBLICATIONS

Anonymous, "Leak Detection With Combined Pressure and Temperature Information," IPCOM No. 000241546, Published May 8, 2015, 2 pages.

*Primary Examiner* — Eric S McCall
(74) *Attorney, Agent, or Firm* — Julia Voutyras; McCoy Russell LLP

(57) ABSTRACT

A method and system is provided for correlating a pressure drop across an exhaust particulate filter with the output of an upstream exhaust oxygen sensor and a downstream exhaust oxygen sensor. The pressure drop is then used to infer leakage of the filter during conditions when an exhaust oxygen concentration across the filter is substantially constant. The diagnostic may be performed during selected entry conditions such as when a particulate level in the GPF is below a predetermined threshold, exhaust flow rate is above a threshold rate, and an absolute exhaust flow rate derivative is below a threshold derivative.

16 Claims, 11 Drawing Sheets

(56) References Cited

U.S. PATENT DOCUMENTS

| | | |
|---|---|---|
| 2009/0013665 A1* | 1/2009 | Brahma .......................... 60/276 |
| 2009/0158715 A1 | 6/2009 | Stroh et al. |
| 2010/0101409 A1* | 4/2010 | Bromberg et al. ................. 95/8 |
| 2011/0072797 A1* | 3/2011 | Van Nieuwstadt ............. 60/285 |
| 2011/0131950 A1* | 6/2011 | Parnin ............................ 60/274 |
| 2012/0125081 A1 | 5/2012 | Yadav et al. |
| 2012/0216507 A1* | 8/2012 | Nieuwstadt .................... 60/274 |
| 2013/0008162 A1 | 1/2013 | Ruona et al. |
| 2013/0213236 A1 | 8/2013 | Takaoka et al. |

* cited by examiner

METHOD AND SYSTEM FOR LEAK DETECTION AT A PARTICULATE FILTER

FIELD

The present disclosure relates to systems and methods for leak detection at a particulate filter coupled in an internal combustion engine, such as a gasoline-fueled engine.

BACKGROUND/SUMMARY

Particulates (e.g., soot) may form in internal combustion engines as a byproduct of some combustion processes. For example, particulates may form in the exhaust gas at high engine speeds or high engine loads. The formation of particulates may also be related to the direct injection of fuel into engine cylinders. Particulate filters in the exhaust line may be used in order to retain the particulates and reduce soot emissions. Over time, the particulates accumulate within the filter, reducing the exhaust flow rate through the exhaust system and creating an engine back pressure which may reduce engine efficiency and fuel economy. To reduce the backpressure, the filter may be intermittently regenerated to burn off accumulated soot. However, even with intermittent regeneration, particulate filters may degrade and leak particulates to the atmosphere through the tailpipe.

One way to determine whether a particulate filter is leaking is through the use of pressure sensors, as shown by Yamakawa et al. in EP 2690263. Therein, a pressure value at an upstream side of a particulate filter and a pressure value at a downstream side of the particulate filter are Fourier-transformed and compared so as to detect an amount of particulates deposited on the particulate filter. The health of the filter is then determined based on the comparison. Another way to determine whether the particulate filter is leaking is shown by Yadav et al. in US 2012/0125081. Therein, the accumulation of particulate matter is determined based on a particulate sensor coupled with a temperature sensor and a flow velocity sensor placed in the exhaust line downstream of the filter. In response to a particulate sensor input value and a particulate sensor temperature, a controller determines a particulate filter diagnostic value. The particulate filter diagnostic value being above a specific value within a predetermined time indicates the particulate filter is leaking soot out to the exhaust.

However, the inventors herein have identified potential issues with such approaches. As one example, in the approach of Yamakawa, there may be an additional cost associated with adding pressure sensors to the exhaust system. In addition, pressure sensors may not be durable in the harsh conditions of the exhaust system, requiring frequent replacement. Further, the differential pressure between the upstream and downstream pressure sensors may need to be substantially different to indicate particulate filter degradation. As another example, in the approach of Yadav, the particulate sensors may need frequent regeneration. As such, the monitoring of the change in amount of particulate matter may need to be done after filter regeneration so as not to corrupt the results of the diagnostic routine. Consequently, there may not be sufficient opportunities for ongoing particulate filter monitoring. Still other issues include the need for extra sensors, such as temperature sensors, which add component cost and control complexity.

The inventors herein have recognized the above mentioned issues and developed a method for determining gasoline particulate filter (GPF) leakage, or degradation, in an exhaust system. The method comprises, during selected conditions, correlating an output of an upstream exhaust oxygen sensor and a downstream exhaust oxygen sensor with a pressure drop across an exhaust particulate filter. The pressure drop may then be correlated with leakage from the particulate filter. The selected conditions may include conditions where the exhaust oxygen concentration across the filter remains substantially constant. In this way, existing exhaust oxygen sensors can be used as pressure sensors during selected conditions, allowing for changes in the partial pressure of exhaust gas oxygen across the filter to be correlated with GPF health As an example, an exhaust system may include a first exhaust gas sensor (e.g., first oxygen sensor) located upstream of an exhaust gasoline particulate filter (GPF) and a second exhaust gas sensor (e.g., second oxygen sensor) located downstream of the GPF. During engine operating conditions, such as regeneration and oxygen uptake in the GPF, the output of the first pre-GPF oxygen sensor and the second post-GPF oxygen sensor may be used to infer filter soot levels. In particular, a change in oxygen concentration across the filter may be correlated with soot mass oxidized within a particulate filter. As such, since the exhaust gas sensors measure a partial pressure of exhaust oxygen, during selected engine operating conditions where the oxygen concentration across the particulate filter remains substantially constant, such as during engine cold start and after filter regeneration, the output of the sensors may differ. Specifically, the upstream oxygen sensor may have a higher output than the downstream sensor. During those conditions, a correction factor based at least on exhaust gas flow rates, may be calculated and applied to correct the sensor outputs. If after correction, a difference between the sensor outputs monitored over a defined time interval is lower than a threshold (e.g., if the corrected output of the pre-GPF exhaust sensor is lower than the output of the post-GPF exhaust sensor), the engine controller may infer that the change in partial pressure across the filter is due to filter degradation. For example, it may be inferred that the GPF is leaking and a diagnostic code may be set.

In this way, existing exhaust gas sensors may be advantageously used during selected conditions to infer particulate filter leakage without the need for other dedicated sensors, such as dedicated pressure or temperature sensors. By monitoring the output of exhaust gas oxygen sensors that are sensitive to the partial pressure of oxygen at operating conditions where the exhaust oxygen concentration across a GPF is not changing, the oxygen sensors may be advantageously used as pressure sensors. A pressure change across the filter, estimated based on the output of the exhaust gas sensors, may then be correlated with filter health. For example, the output of the sensors may be compared after filter regeneration, during engine steady state conditions, and/or after an engine cold start to identify filter degradation based on differences in oxygen partial pressure across the filter. By using components already available in the engine system, component reduction benefits are achieved without reducing the reliability of the results of the diagnostic routine. By monitoring particulate filter health, vehicle emissions compliance may be improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
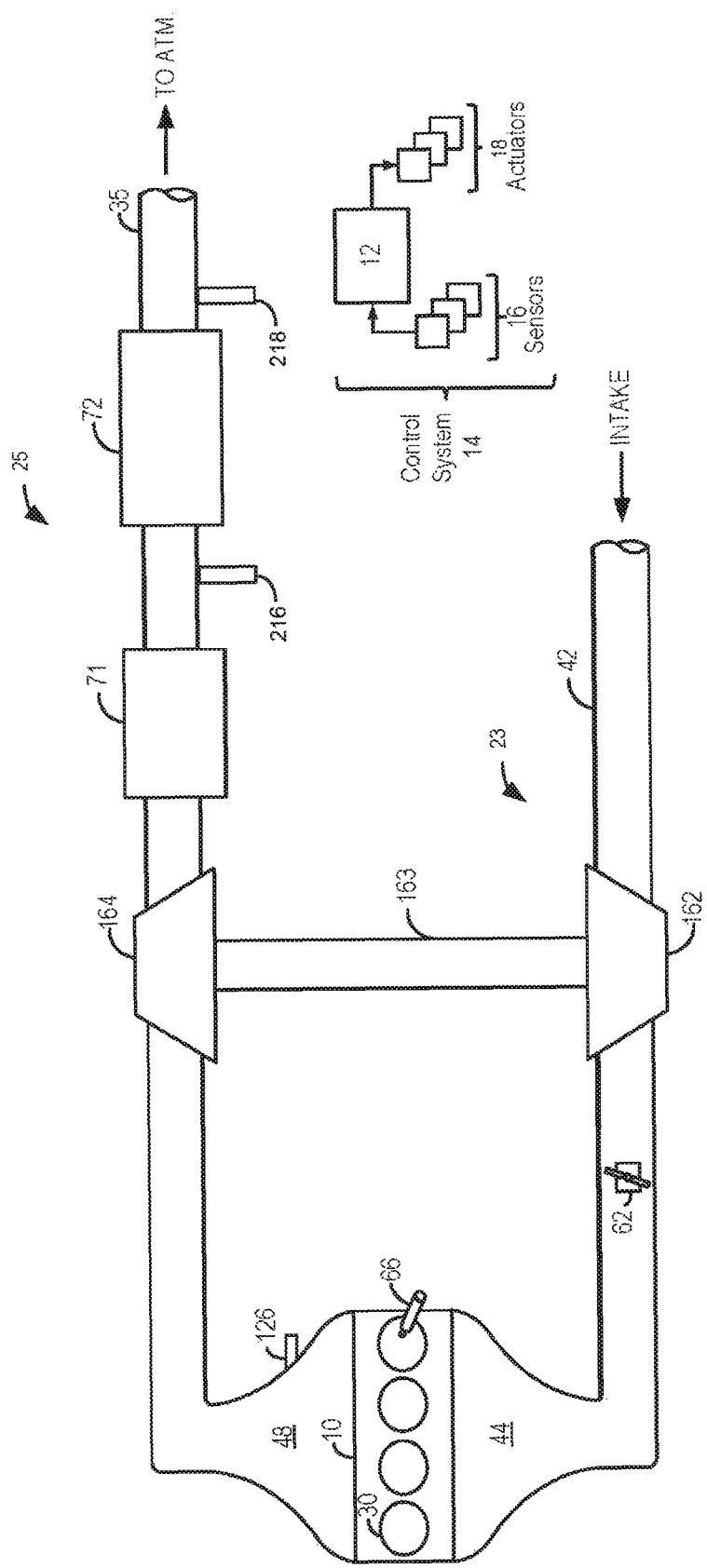
FIG. 1 schematically shows an engine with an exhaust system.
Figure 2:
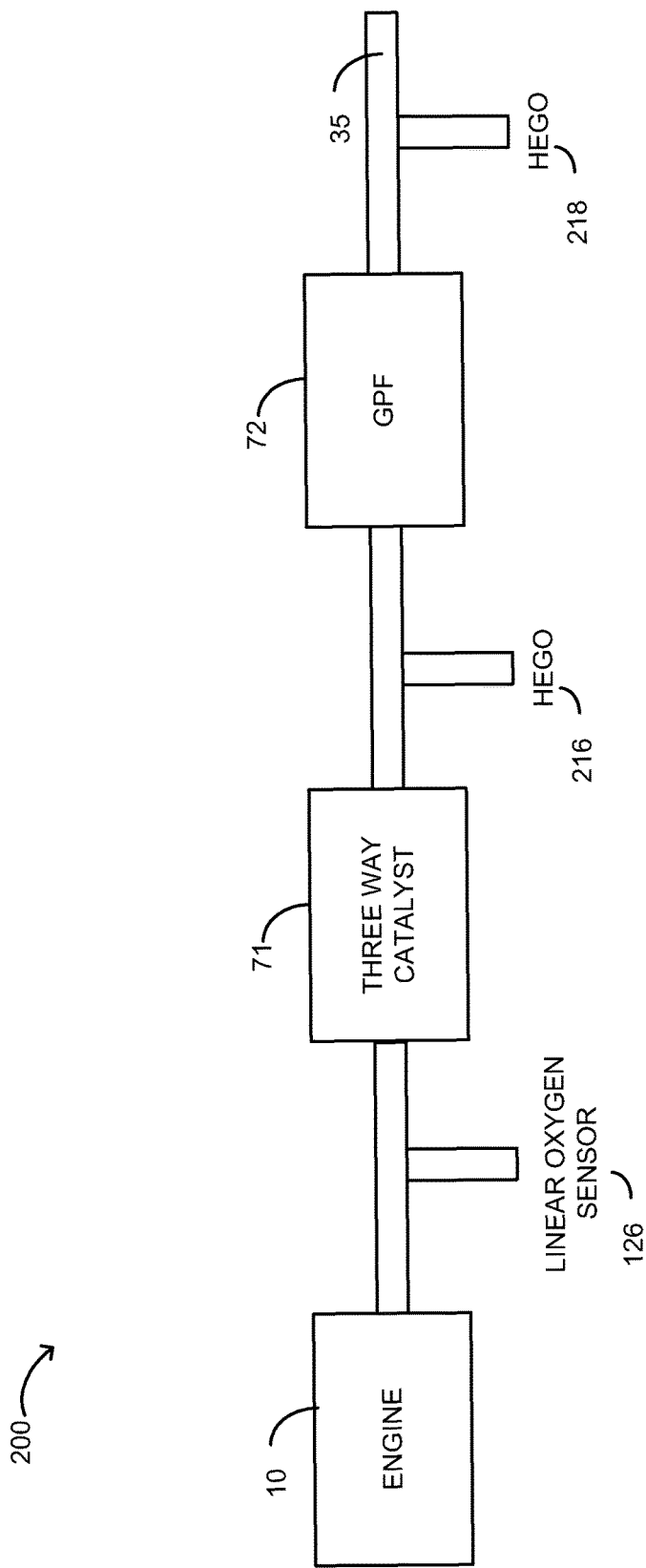
FIG. 2 schematically shows an example embodiment of an exhaust system.
Figure 3:
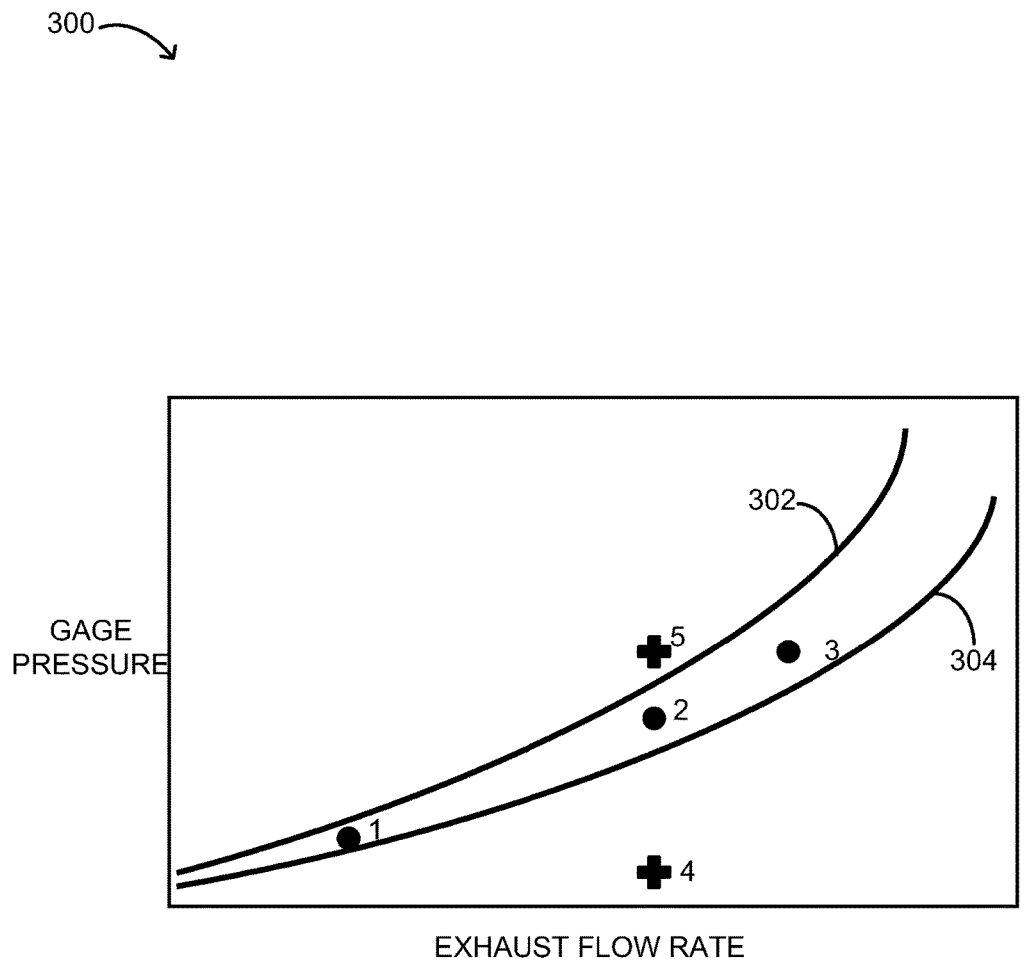
FIG. 3 is a graph illustrating example GPF gage pressures.
Figure 9:
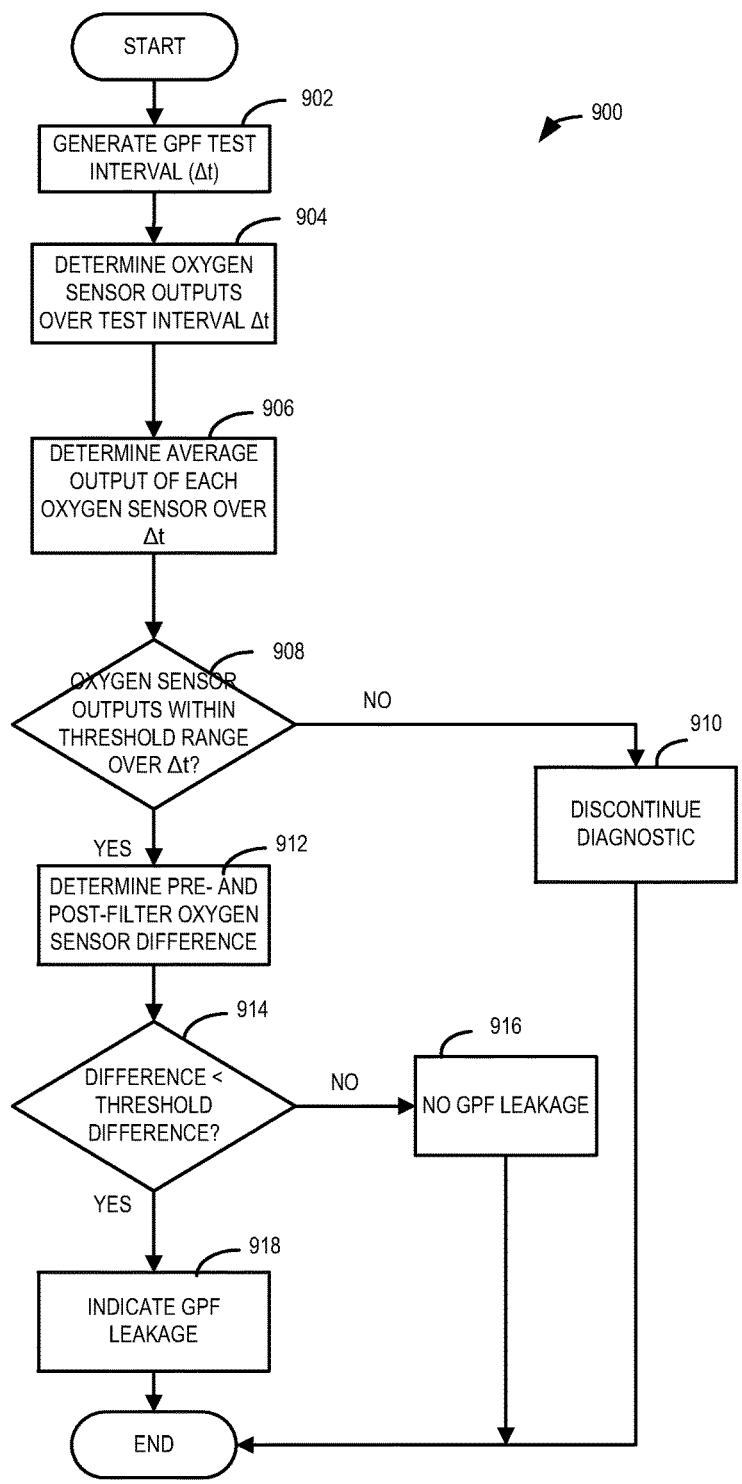
FIG. 9 shows another example method for indicating GPF degradation based on pre- and post-filter oxygen sensor readings.
Figure 10:
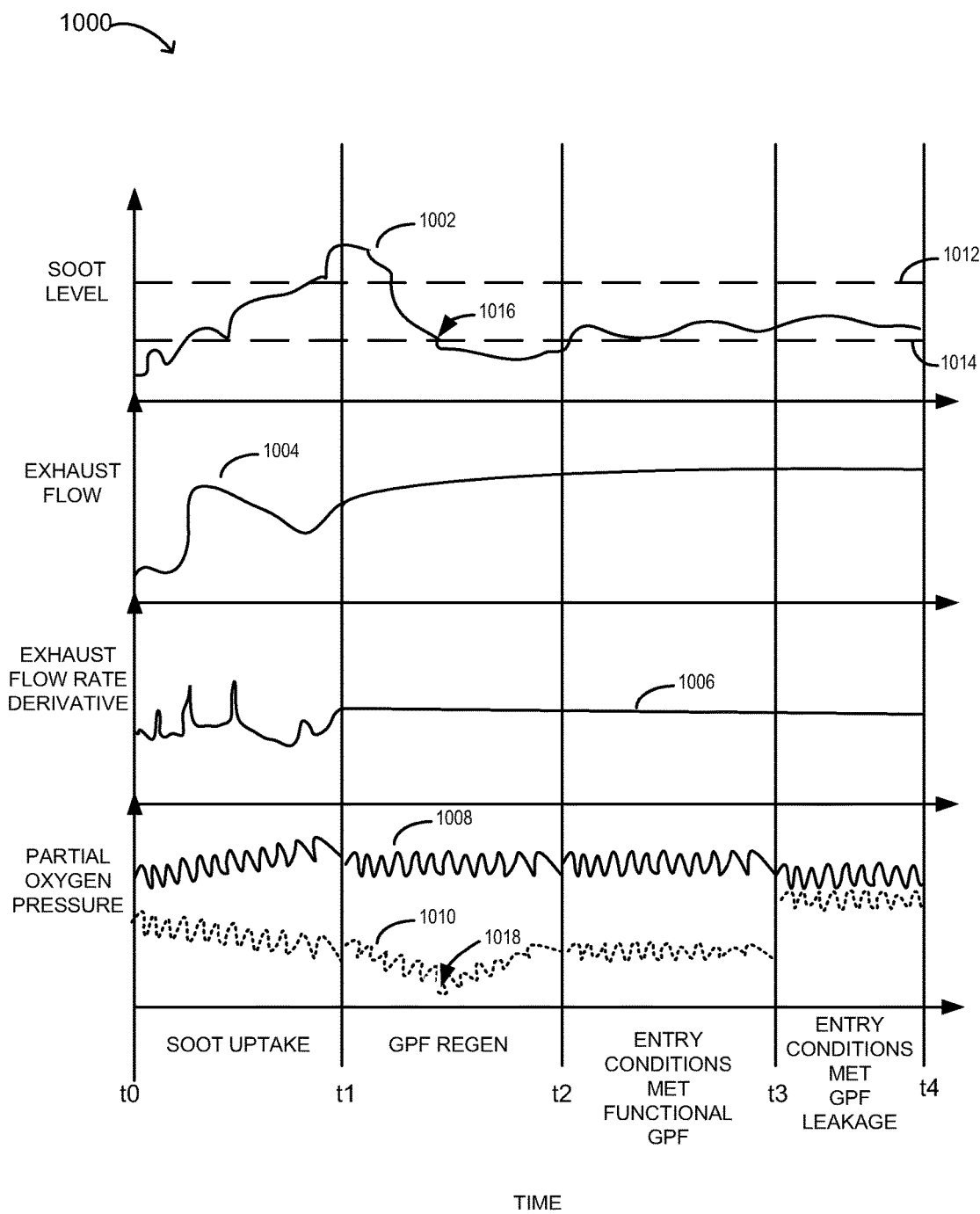
FIG. 10 shows an example of GPF leak detection during selected engine operating conditions based on a change in pre- and post-filter oxygen sensor response over time.
Figure 11:
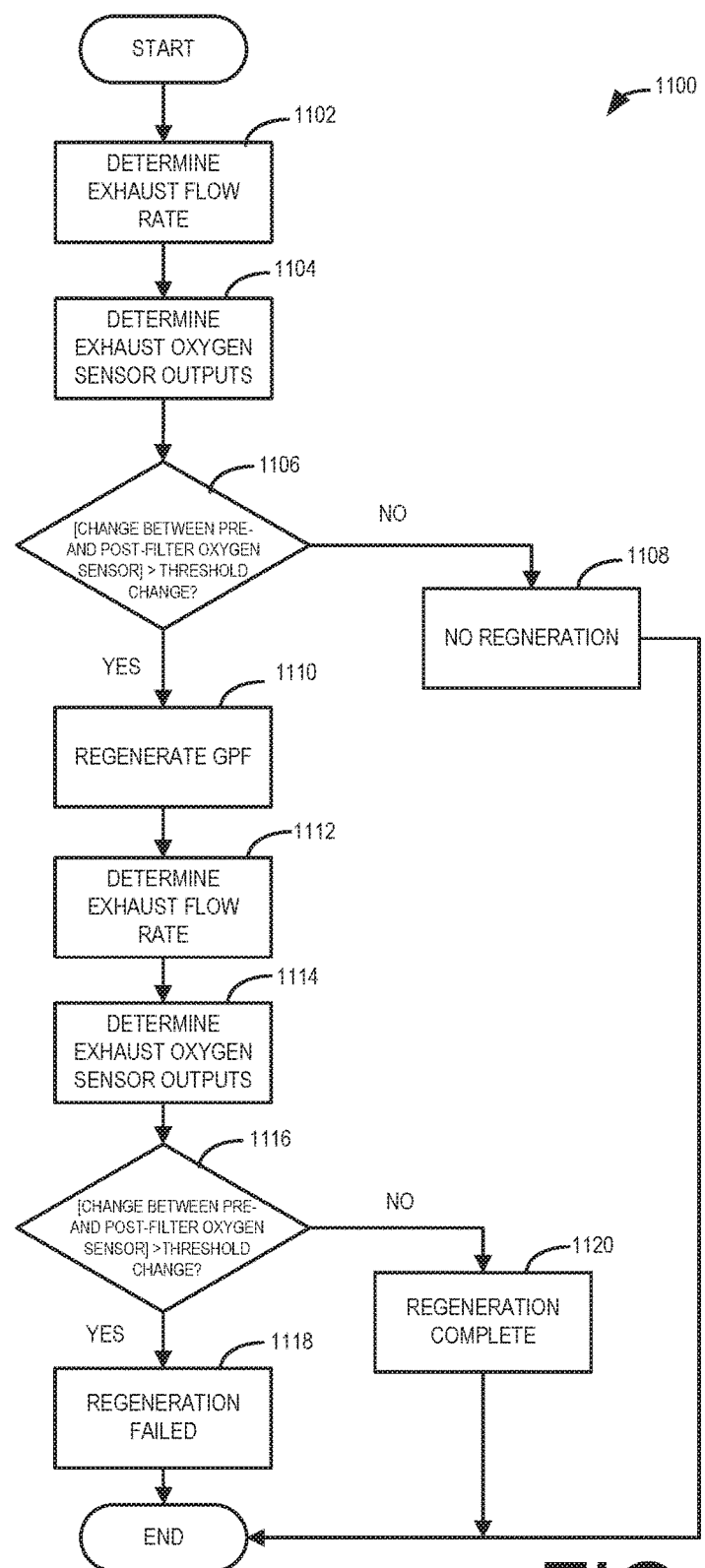
FIG. 11 shows an example method to regenerate the GPF based on pre- and post-filter oxygen sensor readings.

The present description relates to methods and systems for diagnosing degradation of particulate matter from a gasoline particulate filter (GPF) coupled to an engine exhaust system, such as the exhaust system of FIGS. 1-2. The output of exhaust gas oxygen sensors positioned across a GPF at varying exhaust flow rates is shown in FIGS. 3 and 4. During selected conditions, wherein an exhaust oxygen concentration across the particulate filter is substantially constant, the GPF may be monitored for degradation based on the response of the oxygen sensors positioned upstream and downstream of the filter, as illustrated in FIG. 10. An engine controller may be configured to perform diagnostic routines, such as those depicted in FIGS. 5, 8, and 9, to estimate a pressure drop across the particulate filter based on an output of an exhaust oxygen sensor upstream the GPF and an exhaust oxygen sensor downstream the GPF during selected conditions when the oxygen concentration across the filter is not expected to change, such as those illustrated in FIGS. 6 and 7. The controller may then correlate the pressure drop with GPF health. The output of the sensors may be used during still other conditions to learn filter loading and determine if the GPF may be regenerated, as shown in FIG. 11. Example oxygen sensor outputs and their use in determining GPF health is shown at FIGS. 4 and 10. In this way, filter diagnostics may be improved, thereby improving emissions compliance.

FIG. 1 is a schematic diagram showing an engine intake system 23 and engine exhaust system 25 for an engine 10 that may be implemented in a vehicle, such as a vehicle configured for road travel. The engine 10 comprises a plurality of cylinders 30. Each cylinder of engine 10 may include one or more intake valves and one or more exhaust valves (not shown). For example, the valves may be poppet valves located at an upper region of the cylinder. The cylinders 30 may receive fuel from a fuel injector 66. Fuel injector 66 may inject any suitable fuel that includes gasoline, alcohol, or a combination thereof, for example. Fuel injector 66 may be configured to deliver fuel via direct injection, or port injection. Further still, each of cylinders 30 may include a plurality of fuel injectors, such as one direct injector and one port injector. The plurality of fuel injectors may inject the same fuel or different types of fuels, such as fuels of differing alcohol content.

A control system 14 may include sensors 16 that send signals to controller 12. Further, controller 12 may be a computer with readable instructions stored on non-transitory memory. The controller 12 may send signals to actuators 18 based on input from sensors 16 to control operation of engine 10 as well as components of the intake and exhaust system including the above described valves. Example control routines are described herein with regard to FIGS. 6-9 and 11, which may be stored as instructions in memory in the controller.

The engine intake system 23 may include intake passage 42, via which fresh air is delivered to engine 10. Intake passage 42 may include a throttle 62 having a throttle plate. In one example the position of the throttle plate of the throttle 62 may be varied by controller 12 via a signal provided to an electric motor or actuator included with throttle 62, a configuration that is commonly referred to as electronic throttle control (ETC). In this manner, throttle 62 may be operated to vary the intake air provided to combustion chambers among the engine cylinders 30. Further, a compression device, such as a turbocharger or supercharger, including at least a compressor 162, may be arranged along intake manifold 44. For a turbocharger, compressor 162 may be at least partially driven by a turbine 164, for example via shaft 163, arranged along exhaust manifold 48. For a supercharger, compressor 162 may be at least partially driven by the engine and/or an electric machine, and may not include a turbine.

The exhaust system 25 may include exhaust passage 35 comprising one or more emission control devices 71, herein also referred to as an exhaust catalyst, upstream of a gasoline particulate filter (GPF) 72. The emission control devices 71 may process engine exhaust gases to oxidize exhaust gas constituents, for example. Emission control device 71 may include an oxidizing catalyst, a three-way catalyst, a reduction catalyst (e.g., an SCR catalyst), or combinations thereof. For example, emission control devices 71 may be placed in the exhaust line in a close coupled position. Further, engine 10 may include an exhaust gas recirculation (EGR) system (not shown) to help lower NOx and other emissions. The EGR system may be configured to recirculate a portion of exhaust gas from the engine exhaust to the engine intake. In one example, the EGR system may be a low pressure EGR system wherein exhaust gas is recirculated from downstream of the turbine (and upstream or downstream of the emission control device and gasoline particulate filter) to the engine intake, upstream of the compressor. In another example, engine 10 may include a high pressure EGR system in which exhaust gas is delivered from upstream of the turbine to the intake manifold, downstream of the compressor.

The gasoline particulate filter (GPF) 72, herein also referred to as particulate filter or filter, positioned in an engine exhaust passage 35 downstream of an emission control device 71 is configured to retain residual soot and other hydrocarbons exhausted from engine 10 in order to lower particulate emissions. The retained particulates may be oxidized to produce carbon dioxide in a regeneration process that is performed during engine operation, thereby reducing the soot load of the GPF. During regeneration, a temperature of the GPF, and the exhaust entering the GPF, may be raised to burn off the stored soot. As such, GPF regeneration may be performed at high exhaust temperatures (e.g., 600° C. and above) so that the retained particulates are combusted in a quick manner and are not released to the atmosphere. To speed up the regeneration process and oxidize the soot in an efficient manner, exhaust gas entering the particulate filter may be temporarily enleaned. GPF 72 may communicate with exhaust manifold 48 at a location downstream of emissions control device 71. In some embodiments, GPF 72 may include a washcoat to lower emissions further. For example, the washcoat may comprise one or more of a lean NOx trap (LNT), a selective catalytic reducer (SCR) or a catalytic oxidizer (CO). Further, the washcoat loading may be varied when applied to the filter.

The exhaust system may include at least two exhaust gas sensors. In the depicted embodiment, three exhaust gas sensors 126, 216, and 218 are shown coupled in the exhaust system 25. In one example, the exhaust gas sensors 126, 216, and 218 may be oxygen sensors which may be selected from among various suitable sensors for providing an indication of exhaust gas air/fuel ratio. The oxygen sensors may be linear oxygen sensors or switching oxygen sensors. As an example, the oxygen sensors may be one of a UEGO sensor (universal or wide-range exhaust gas oxygen), a two-state oxygen sensor or EGO sensor, or a HEGO (heated EGO) sensor. Exhaust gas oxygen sensors 126, 216 and 218 may assess a concentration of oxygen present in the exhaust gas. Exhaust gas sensor 126 may be a feed-gas oxygen sensor positioned upstream of emissions control device 71 configured to sense feed-gas exhaust oxygen concentrations. Exhaust gas sensor 216 may be a first exhaust gas oxygen sensor positioned upstream of particulate filter 72 while exhaust gas sensor 218 may be a second exhaust gas oxygen sensor positioned downstream of filter 72. Exhaust gas sensors 216 and 218 may sense tailpipe exhaust oxygen concentrations about the GPF. First, upstream exhaust gas oxygen sensor 216, may also be referred to herein as the pre-GPF oxygen sensor or the pre-filter oxygen sensor, while second, downstream exhaust gas oxygen sensor 218, may also be referred to herein as the post-GPF oxygen sensor or the post-filter oxygen sensor. In one example, first and second oxygen sensors 216 and 218 may each be HEGO sensors while feed-gas oxygen exhaust sensor 126 is a UEGO sensor. In another example, each of sensors 216, 218 may be UEGO sensors. In still another example, the first oxygen sensor 216 may be a UEGO sensor, second oxygen sensor 218 may be a HEGO sensor, and feed-gas oxygen exhaust sensor 126 may also be a HEGO sensor.

The air-fuel ratio of exhaust released from cylinders 30 may be determined by one or more of the oxygen sensors located in the exhaust stream of the engine. Based on the estimated exhaust air-fuel ratio, fuel injection to engine cylinders may be adjusted so as to control the air-fuel ratio of cylinder combustion. For example, fuel injection amounts to the cylinders may be adjusted based on a deviation of the exhaust air-fuel ratio, estimated based on the output of one or more of exhaust gas sensors 126, 216, and 218, and a desired air-fuel ratio (such as a deviation from stoichiometry).

As such, the exhaust gas oxygen sensors 126, 216, and 218 may be sensitive to the partial pressure of oxygen in the exhaust gas. Specifically, each oxygen sensor outputs a voltage based on a difference in exhaust gas oxygen concentration and ambient air oxygen concentration. During a rich engine mode, the exhaust gas oxygen concentration is deficient causing a higher voltage reading to be output. During a lean engine mode, the exhaust gas oxygen concentration is in excess causing a lower voltage reading to be output. The voltage output of the oxygen sensor may be correlated with the partial pressure of oxygen in the exhaust gas mixture. As a result, even during conditions when the oxygen concentrations across the filter are substantially constant, such as during cold start, after a filter has been regenerated, and/or during steady state engine operation, the output voltage of the first and second oxygen sensors positioned across GPF 72 may differ due to differences in the partial pressure of oxygen upstream and downstream of the GPF. In particular, the output voltage of the pre-filter oxygen sensor 216 may be lower than the output voltage of the post-filter oxygen sensor 218. The output voltage of the pre-filter oxygen sensor 216 is indicative of a first partial oxygen pressure and the output voltage of the post-filter oxygen sensor 218 is indicative of a second partial oxygen pressure wherein, during conditions with constant oxygen concentration, the first partial oxygen pressure is higher than the second partial oxygen pressure due to the post-filter oxygen sensor 218 being downstream of the pre-filter oxygen sensor 216. The output of the pre-filter oxygen sensor 216 may be corrected using a correction factor based at least on exhaust flow rate. The corrected output of the upstream pre-filter oxygen sensor 216 is then expected to better match the output of the downstream post-filter oxygen sensor 218.

The inventors herein have recognized that this property of the oxygen sensors may be advantageously leveraged during selected conditions to estimate an exhaust pressure change using the oxygen sensors. Specifically, during conditions when the exhaust oxygen concentration across the filter is substantially constant (e.g., the difference in exhaust oxygen concentration across the filter is less than a threshold), the voltage output of the pre-filter oxygen sensor 216 and the voltage output of the post-filter oxygen sensor 218 may be used to learn a pressure drop across the filter. For a GPF that is functioning (that is, not degraded), during conditions when the oxygen concentration across the filter is substantially constant, after applying the correction factor to the output of the first, pre-filter oxygen sensor 216, the corrected pre-filter oxygen sensor output may show a value that is substantially equal to (or slightly greater than) the post-filter oxygen sensor output. In comparison, for a GPF that is degraded (for example, a filter that is leaking particulates), during conditions when the oxygen concentration across the filter is substantially constant, the corrected pre-filter oxygen sensor output may show a value that is less than the post-filter oxygen sensor output. Example pre- and post-filter oxygen sensor partial oxygen pressure outputs at different engine operating conditions (including conditions of constant exhaust gas oxygen concentration and varying exhaust gas oxygen concentration) are shown in FIGS. 4 and 10.

Thus, based on engine operating conditions, the controller 12 may operate the engine exhaust system in different modes. As an example, the exhaust system may be operated in a first mode wherein a voltage output of the first upstream exhaust gas oxygen sensor relative to the voltage output of the second downstream exhaust gas oxygen sensor is only correlated with a change in exhaust oxygen concentration across the particulate filter. The exhaust system may also be operated in a second mode wherein the voltage output of the first sensor relative to the voltage output of the second sensor is only correlated with a change in exhaust pressure across the filter. For example, the controller may operate in the first mode during a first condition when an exhaust flow rate is less than a threshold and operate in the second mode during a second condition when an exhaust flow rate is greater than the threshold.

In some embodiments, one or more additional sensors may be positioned in the intake and exhaust system. These may include additional temperature, oxygen, and particulate matter sensors, for example. It will be understood that the depicted engine 10 is shown only for the purpose of example and that the systems and methods described herein may be implemented in or applied to any other suitable engine having any suitable components and/or arrangement of components.

Turning to FIG. 2, an example embodiment 200 of an engine exhaust system is shown. In one example, embodiment 200 may include engine exhaust system 25 of FIG. 1. It will be appreciated that components previously introduced in FIG. 1 may be numbered similarly in FIG. 2. The depicted embodiment pertains to relying on two exhaust gas sensors, specifically exhaust gas oxygen sensors, positioned across a particulate filter. The two sensors include a first, upstream exhaust gas sensor 216 and a second, downstream exhaust gas sensor 218 positioned across an exhaust GPF 72, coupled to an exhaust passage 35. Exhaust passage 35 further includes an exhaust catalyst 71, depicted herein as a three-way catalyst (TWC). An additional linear oxygen sensor 126 is positioned upstream of the TWC 71. Linear oxygen sensor 126 senses exhaust feed-gas oxygen concentration. The TWC 71 is positioned downstream of exhaust gas sensor 126 and upstream of GPF 72 for emissions control. The TWC is a catalytic converter that reduces hydrocarbon, carbon monoxide, and nitrogen oxide emissions in exhaust gas. GPF 72 is positioned downstream of the TWC and is shown with no washcoat in this example. However, in alternate embodiments, the GPF 72 may include a catalytic washcoat. Exhaust gas sensors 216 (herein also referred to as pre-filter oxygen sensor) and 218 (herein also referred to as a post-filter oxygen sensor), are shown as HEGO sensors. In alternate examples, each of the pre-filter oxygen sensor and the post-filter oxygen sensor may be one of an EGO, UEGO, and a HEGO sensor. The pre-filter and post-filter oxygen sensors measure an output voltage that is indicative of the partial pressure of oxygen in the exhaust gas at the pre-GPF and post-GPF locations. During a mode of engine operation when the oxygen concentration of exhaust gas is substantially constant, the output of the first sensor may be corrected with a correction factor based on a pressure estimate for an intact (e.g. functional) GPF in turn based on the exhaust flow rate. The pre- and post-filter oxygen sensors outputs may then be used to determine GPF degradation, as will be described in FIGS. 3-10. During other modes of operation, when the oxygen concentration of exhaust gas is changing, the output of the first sensor and second sensor may be used to determine particulate filter load levels (e.g., loading or unloading) and to further determine when to initiate particulate filter regeneration, as will be described in FIG. 11. The outputs of the sensors may also be used to infer an exhaust air-fuel ratio and adjust an engine fueling, as described in FIG. 1.

Turning to FIG. 3, an example graph 300 is shown illustrating the gage pressure response at the pre-filter oxygen sensor due to exhaust gas flow rate through a GPF with no washcoat. As such, the gage pressure response includes the response of the pre-filter oxygen sensor and is indicative of exhaust pressure relative to ambient pressure at a location upstream of the GPF. Thus, based on the gage pressure response, a controller may determine a correction value to apply to a pre-filter oxygen sensor during a method as outlined in FIGS. 8 and 9. The gage pressure response and corresponding correction factor for a given GPF may be stored in the computer's memory in a look-up table as a function of exhaust flow rates.

Curves 302 and 304 of graph 300 show the expected boundaries for a gage pressure response of a functional GPF during changes in exhaust flow rate. The curves 302 and 304 share a common origin at a low exhaust flow rate. Curve 302 illustrates an upper threshold boundary for a functional GPF response. Curve 304 illustrates a lower threshold boundary for a functional GPF response. As used herein, a functional, intact, GPF indicates a filter having a soot level that is lower than a threshold load and that is not leaking. As the exhaust flow rate increases, curves 302 and 304 separate further from one another, showing the variation in gage pressure for a functional GPF as the exhaust gas flow rate increases. As such, a gage pressure response of a filter at a given exhaust flow rate being within curves 302 and 304 indicates a functional GPF. Thus, for a given exhaust gas flow rate, a value of the gage pressure for a functional GPF may be determined from a graph, for example graph 300, and a correction factor, which is correlated with a pressure estimate for an intact GPF which is in turn based on the exhaust flow rate, may be looked up in a table stored in the on board computer. The correction factor may be applied to the pre-filter oxygen sensor output such that the corrected pre-filter output value may now be substantially the same as the post-filter oxygen sensor output. An example correction factor is further elaborated in FIG. 4.

The data points 1-5 labeled on the graph 300 depict different GPF gage pressure responses for a given GPF. The data points shown in a first set of points 1-3 are due to increasing exhaust flow rate through a functional GPF and the data points at a second set of points 4-5 are due to a constant exhaust flow rate through a GPF. In particular, point 4 depicts a filter that is leaking, which may show a gage pressure below curve 304, and point 5 depicts a filter having a high soot load, which may show a gage pressure above curve 302. The points 1-3 indicate a functional GPF response during engine operating conditions where the exhaust oxygen concentration remains substantially constant. The data point 4 indicates a possible response when oxygen concentration through the GPF remains substantially constant but the GPF may not be functioning. The data point 5 indicates a possible response when an oxygen concentration through the GPF is changing. Data points 4-5 are shown for the same exhaust flow rate as data point 2. The response of the pre-filter oxygen sensor and post-filter oxygen sensor at data points 1-5 are further elaborated in FIGS. 4A and 4B.

In alternate examples, where the GPF may include a LNT, SCR, or OC washcoat applied to the filter surface, the response of the filter may vary. For example, the upper and lower boundary thresholds may vary. As such, the gage pressure response due to the exhaust gas flow rate through a GPF may vary based on whether the GPF has a washcoat applied. As such, for a functional GPF (with or without a washcoat), the gage response may be determined by the manufacturer, for example.

Figure 4A:
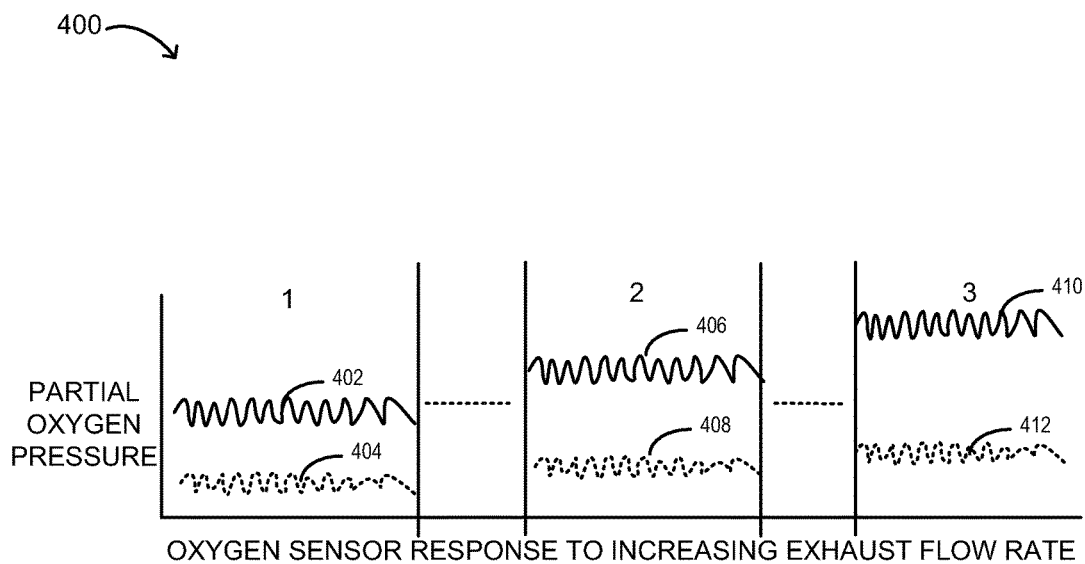
FIGS. 4A and 4B show example responses of exhaust system oxygen sensors positioned across a gasoline particulate filter to changes in exhaust flow rate.
Figure 4B:
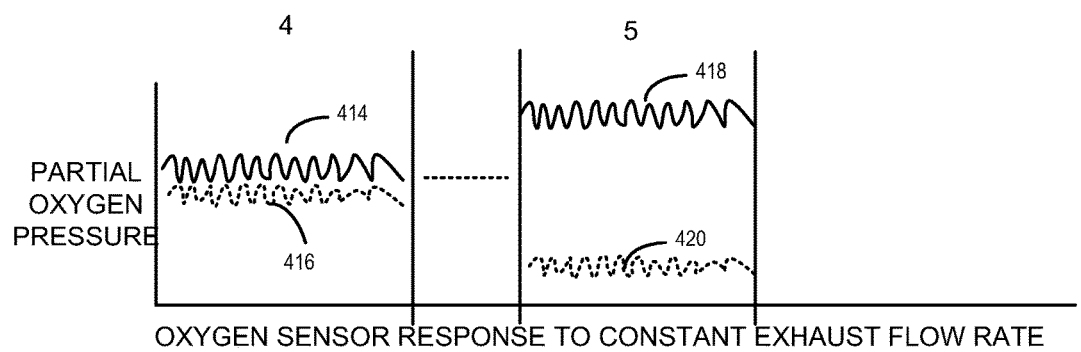

Turning to FIGS. 4A and 4B, example graph 400 illustrates the partial oxygen pressure responses of the pre-filter oxygen sensor and post-filter oxygen sensor for the first set of data points (1-3) and the second set of data points (4-5), previously shown on graph 300 in FIG. 3. In particular, graph 400 shows the pre-filter and post-filter oxygen sensor partial oxygen pressure response, wherein the exhaust gas oxygen concentration may be substantially constant through the GPF based on selected operating conditions. For a functional GPF, at a given exhaust flow rate, the oxygen sensors voltage output may be correlated with the partial pressure of exhaust gas oxygen. Therefore, a substantially constant exhaust gas oxygen concentration may show a higher oxygen partial pressure at the pre-filter oxygen sensor than the post-filter oxygen sensor.

The first set of points (1-3) show the oxygen sensor partial oxygen pressure response over an interval due to increasing exhaust flow rate for a functional GPF. Data point 1 illustrates a low exhaust flow rate, as seen on FIG. 3. Curve 402 shows the pre-filter oxygen sensor response and curve 404 shows the post-filter oxygen sensor response at a given exhaust flow rate. Curve 402 shows a higher partial oxygen pressure response than curve 404 for a constant oxygen concentration. For example, a correction factor applied to the output of the pre-filter oxygen sensor for this exhaust flow rate would shift curve 402 to be nearly the same as the post-filter oxygen sensor output curve 404.

Data point 2 illustrates a medium exhaust flow rate, as seen on FIG. 3. Curve 406 shows the pre-filter oxygen sensor response and curve 408 shows the post-filter oxygen sensor response at a given exhaust flow rate for a functional GPF. The pre-filter oxygen sensor reads a partial oxygen pressure larger than the post-filter oxygen sensor. Applying a correction factor to the output of the pre-filter oxygen sensor may give approximately the same partial oxygen pressure as the post-filter oxygen sensor output. In one example, during conditions of constant exhaust oxygen concentration across the filter as shown, at an exhaust flow rate of 800 m3/hr, the gage pressure pre-filter is 200 hPa, corresponding to an absolute pressure of 1200 hPa and a correction factor of 0.9, or −10%. Under normal operation, we would apply a −10% correction factor for the pre-filter oxygen sensor partial oxygen pressure, and expect the pre- and post-filter oxygen sensors to read substantially the same oxygen partial pressure.

Data point 3 illustrates a high exhaust flow rate, as seen on FIG. 3. Curve 410 shows the pre-filter oxygen sensor response and curve 412 shows the post-filter oxygen sensor response at a given exhaust flow rate for a functional GPF. Data point 3 shows similar characteristics to data points 1 and 2. Thus, a pre-filter oxygen sensor output and post-filter oxygen sensor output about a functional GPF should show approximately the same partial oxygen pressure after applying a correction factor to the pre-filter oxygen sensor output.

However, the filter may not be functional and responses other than those illustrated in data points 1-3 may be seen. The second set of data points 4-5, taken at the same exhaust flow rate as data point 2, show the partial oxygen pressure at the pre-filter and post-filter oxygen sensors due to a constant exhaust flow rate for a leaking GPF, point 4, and a high soot load GPF, point 5.

Data point 4 illustrates the pre-filter and post-filter oxygen sensors partial oxygen pressure outputs for a GPF that is leaking. Curve 414 shows the pre-filter oxygen sensor partial pressure output and curve 416 shows the post-filter oxygen sensor partial pressure output. The post-filter oxygen sensor partial oxygen pressure outputs are similar to the pre-filter oxygen sensor partial oxygen pressure outputs. Applying a correction factor to the pre-filter oxygen sensor output may result in the pre-filter partial oxygen pressure being lower than the post-filter partial oxygen pressure. In a previous example, during conditions of constant exhaust oxygen concentration across the filter as shown, at an exhaust flow rate of 800 m3/hr, the gage pressure pre-filter is 200 hPa, corresponding to an absolute pressure of 1200 hPa and a correction factor of 0.9, or −10%. Under normal operation, as shown at data point 2, then we would apply a −10% correction factor for the oxygen sensor pre-filter, and expect the pre- and post-filter oxygen sensors to read about the same partial oxygen pressure. However, under conditions where the GPF is not functioning, the correction factor will over-correct the pre-filter oxygen sensor output. Thus, this effect may be used to monitor the GPF for leakage. Alternatively, in another example, the uncorrected outputs may be used and if the pre-filter oxygen sensor output does not read substantially higher than the post-filter oxygen sensor output, the GPF is determined to be leaking.

Data point 5 illustrates the pre-filter and post-filter oxygen sensor partial oxygen pressure output for a GPF comprising a high soot level. High soot levels in the filter may uptake oxygen from the exhaust gas flow and cause a difference in the oxygen concentration between the pre-filter oxygen sensor and the post-filter oxygen sensor. For example, if regeneration of the filter has not occurred, the soot level stored in the GPF may be above a threshold load. Curve 418 shows the pre-filter oxygen sensor partial pressure response and curve 420 shows the post-filter oxygen sensor partial pressure response. The pre-filter oxygen sensor partial pressure outputs show a partial oxygen pressure much higher than the post-filter oxygen sensor outputs. Applying a correction factor to the pre-filter oxygen sensor outputs may result in a partial oxygen pressure value that is larger than the post-filter oxygen sensor output. In a previous example, during conditions of constant exhaust oxygen concentration across the filter as shown, at an exhaust flow rate of 800 m3/hr, the gage pressure pre-filter is 200 hPa, corresponding to an absolute pressure of 1200 hPa and a correction factor of 0.9, or −10%. Under normal operation, as shown at data point 2, we would apply a −10% correction factor for the oxygen sensor pre-filter, and expect the pre- and post-filter oxygen sensors to read the same oxygen concentration. However, under conditions where the GPF has a high soot load, the correction factor may under-correct the pre-filter oxygen sensor output and the pre-filter partial oxygen pressure may be larger than the post-filter partial oxygen pressure. Thus, this effect may be used to monitor the GPF for soot level.

Figure 5:
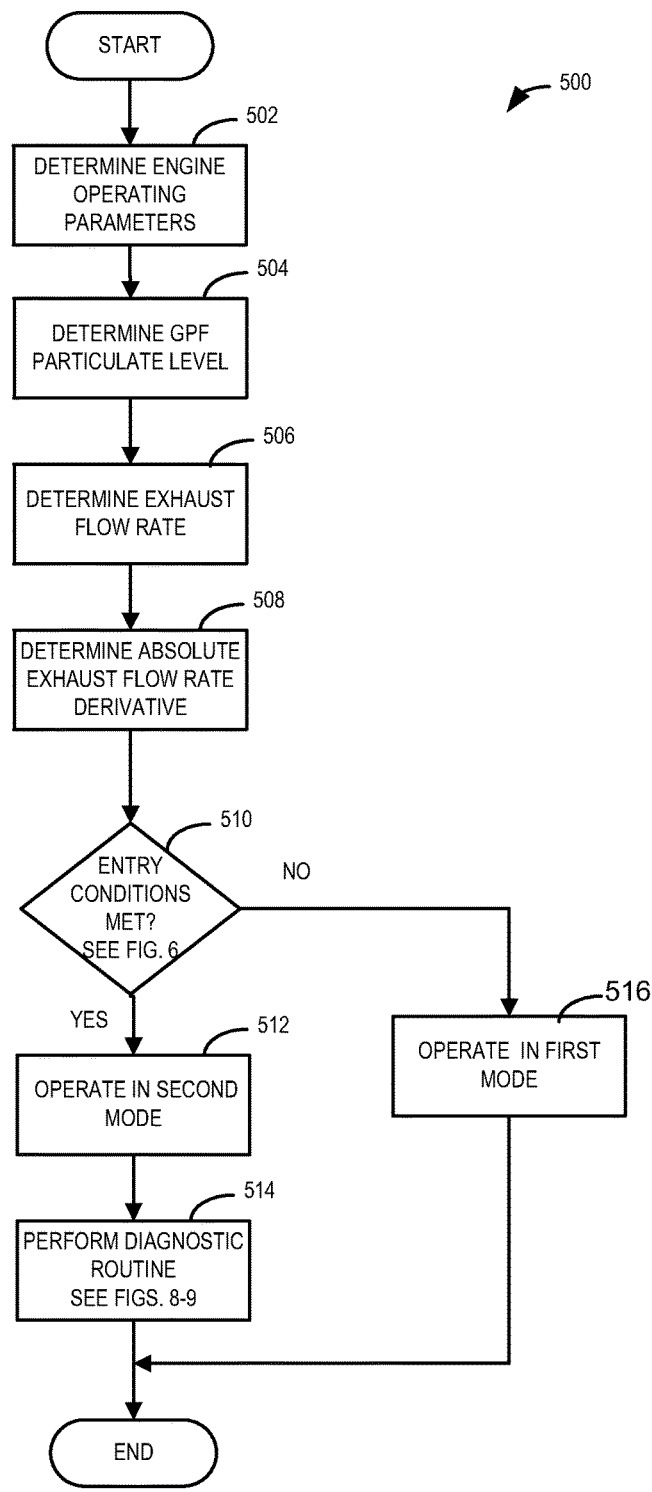
FIG. 5 shows an example method for selectively initiating a GPF diagnostic routine based on engine operating conditions.

Turning to FIG. 5, an example method 500 is shown to evaluate the GPF health. Method 500 determines if selected entry conditions for a substantially constant exhaust oxygen concentration across a particulate filter are met in order to allow a diagnostic routine to be performed.

At 502, the method may determine engine operating parameters. For example, the method may determine engine speed-load conditions, engine temperature, exhaust temperature, exhaust flow rate, boost level, etc.

At 504, the method may estimate the particulate level or particulate load of the GPF. This may be done by measuring or inferring a soot level in the GPF. For example, a soot accumulation model, such as an open loop model, that estimates the amount of soot produced by an engine may be used as the basis for soot level estimation in the GPF. In another example, the post-filter oxygen sensor output may be monitored for a continuous drop in oxygen partial pressure which may be related to soot oxygen storage, and thereby to soot load of the filter. Further, if a washcoat is provided on the GPF, the method may determine the loading and/or oxygen reaction of that particular washcoat by monitoring the post-filter oxygen sensor output for a continuous drop or determining if engine operating parameters are such as to allow for reaction of exhaust gas oxygen with the washcoat.

At 506, the method may determine the exhaust flow rate. The exhaust flow rate may be estimated based on engine operating conditions or based on the output of an intake or exhaust flow sensor.

At 508, the method may determine the absolute exhaust flow rate derivative. As such, the absolute exhaust flow rate derivative is used to indicate whether the engine is in steady state or transient conditions.

At 510, the method may determine if the entry conditions to diagnose the GPF health are met. The entry conditions may comprise selected conditions to better enable a constant exhaust oxygen concentration. As such, each of a plurality of entry conditions may be met for the diagnostic routine to be initiated, as elaborated at FIG. 6. For example, a GPF with no washcoat may have selected entry conditions including each of a particulate filter load being less than a threshold load, exhaust flow rate being higher than a threshold, and the engine being in steady-state operating conditions. If at 510, selected entry conditions are not met, the method 500 may proceed to 516 and may operate in a first mode. If at 510, selected entry conditions are met, the method 500 may proceed to 512 and operate in a second mode.

At 512, the method may operate in a second mode, wherein, during the selected conditions at 510, the exhaust flow rate is greater than a second threshold. During the second mode, selected entry conditions may include the particulate load of the filter being less than the threshold load. The oxygen concentration may be substantially constant during these conditions.

Figure 8:
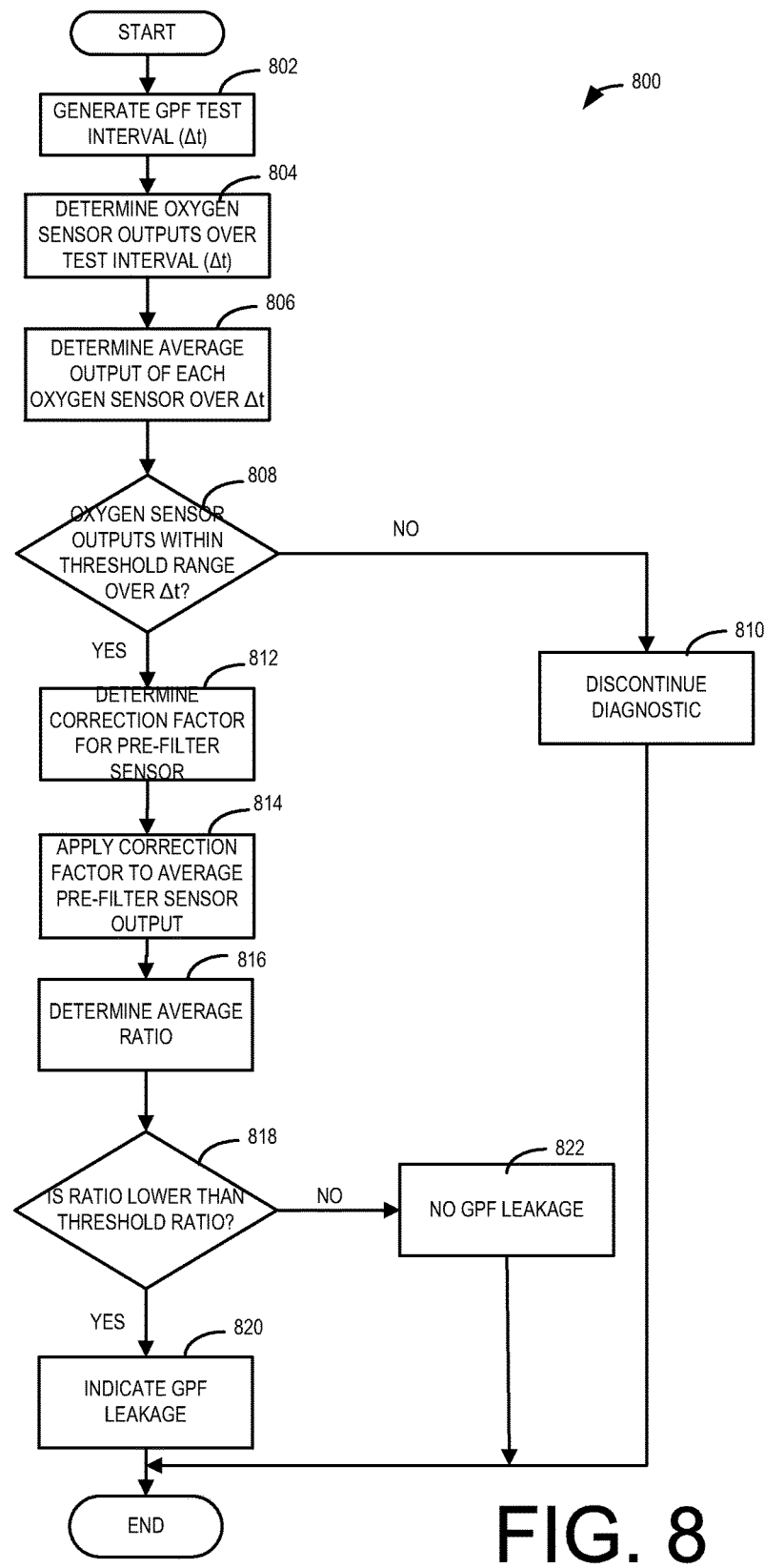
FIG. 8 shows an example method for indicating GPF degradation based on pre- and post-filter oxygen sensor readings.

From 512, the method may proceed to 514 and perform a diagnostic routine to evaluate GPF health. At 514, method 500 may run a diagnostic routine as illustrated in FIGS. 8 and 9, for example. The diagnostic routine may use the pre-filter and post-filter oxygen sensors outputs to determine if a GPF is functional or leaking and, during selected conditions, correlate an output of an upstream exhaust oxygen sensor and a downstream oxygen sensor with a pressure drop across an exhaust particulate filter. Leakage may be indicated based on the pressure drop being lower than a threshold drop. The method may then end.

From 510, the method may proceed to 516 when selected entry conditions are not met and operate in a first mode. During the first mode, selected conditions may include a particulate load of the filter being more than a threshold load and an exhaust flow rate being lower than a threshold flow rate. The oxygen concentration during these conditions may vary across the filter, for example. The method may then end.

Figure 6:
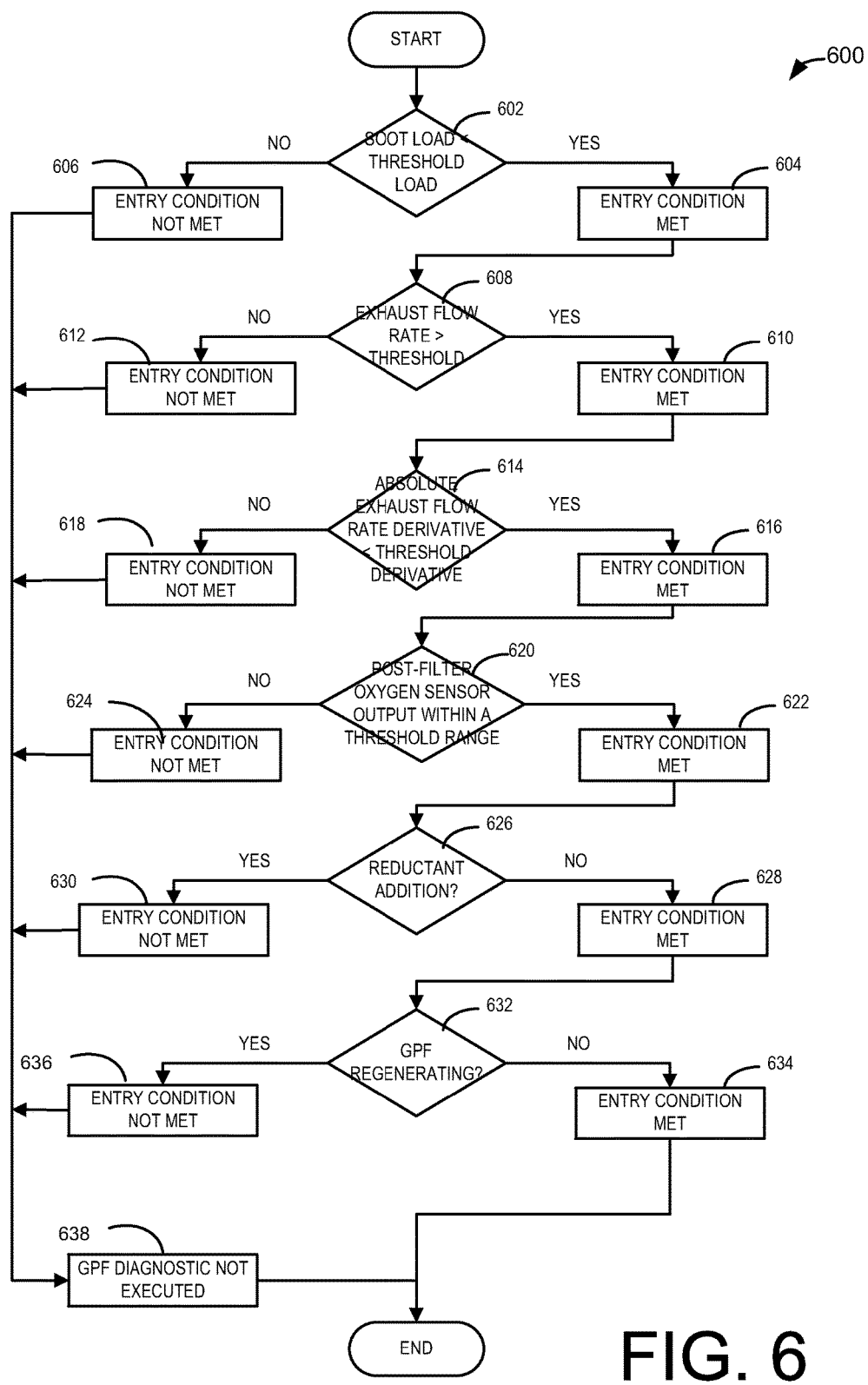
FIG. 6 shows an example flow chart illustrating various entry conditions which may be selected of the diagnostic routine of FIG. 5.

Turning now to FIG. 6, an example flow chart 600 is shown illustrating entry conditions that may be used at 510 in method 500. The selected entry conditions vary based on the specific system, but may represent conditions where the exhaust gas oxygen concentration is substantially constant. For a specific system, the selected entry conditions may need to be met for a specified GPF diagnostic interval. For example, the diagnostic interval may occur during a time period after a cold start. During a cold start the exhaust gas temperature is low, the GPF may not store oxygen or react with oxygen contained in the exhaust gas, and thus a constant oxygen concentration in the exhaust gas flow is better enabled. If at least one entry condition is not met, the GPF test interval may not be generated and the diagnostic routine may not be executed.

At 602, the method may determine if the soot level is below a threshold load. The soot level may be measured or estimated. As such, accumulation of soot in the GPF may lead to oxygen storage which may cause the post-filter oxygen sensor to read substantially lower partial oxygen pressures than the pre-filter oxygen sensor. Further, a continuous drop in the output of the post-filter oxygen sensor may indicate oxygen uptake by the GPF. If the soot level is below a threshold load, such as after the filter has been sufficiently regenerated, the soot load entry condition is considered met at 604 and the routine proceeds to confirm other entry conditions. If the soot level is not below a threshold load, the entry condition is not met at 606 and the GPF health diagnostic routine is not executed at 638.

At 608, the method may determine if the exhaust flow rate is above a threshold. An exhaust flow rate above a threshold provides an exhaust flow rate high enough to achieve a nominal pressure on the oxygen sensors. If the exhaust flow rate is above the threshold, the exhaust flow rate entry condition is considered met at 610 and the routine proceeds to confirm other entry conditions. If the exhaust flow rate is not above the threshold, the entry condition is not met at 612 and the GPF health diagnostic routine is not executed at 638.

At 614, the method may determine if an absolute exhaust flow rate derivative is below a threshold derivative. An absolute exhaust flow rate derivative below a threshold derivative indicates engine steady state operation. If the absolute exhaust flow rate derivative is below a threshold derivative, the absolute exhaust flow rate derivative entry condition is considered met at 616 and the routine proceeds to confirm other entry conditions. If the absolute exhaust flow rate derivative is not below a threshold derivative, the entry condition is not met at 618 and the GPF health diagnostic routine is not executed at 638.

At 620, the method may determine if the post-filter oxygen sensor outputs are within a threshold range, wherein the threshold range accounts for normal oxygen sensor fluctuations. In one example, the post-filter oxygen sensor outputs may experience fluctuations in the partial oxygen pressure due to side reactions in the GPF. For example, if a CO washcoat is applied, the oxygen may react with hydrocarbons and may cause a decrease in the post-filter oxygen sensor output. As another example, if the soot level is high the soot may adsorb the oxygen and cause decreasing partial oxygen pressure readings at the post-filter oxygen sensor. If the change in the post-filter oxygen sensor output is below a threshold range, the entry condition is considered met at 622 and the routine proceeds to confirm other entry conditions. If the change in the post-filter oxygen sensor output is not below a threshold range, the entry condition is not met at 624 and the GPF health diagnostic routine is not executed at 638. Further, the pre-filter oxygen sensor may also be monitored to be within a threshold range.

At 626, the entry conditions may determine if reductant is being added for use in the GPF. For example, a GPF with a SCR washcoat may need reductant to react with NOx. The reaction of the NOx with the reductant also includes oxygen, which causes a decrease in the oxygen concentration at the post-filter oxygen sensor. In one example, urea may be stored as a reductant to provide ammonia to the SCR catalyst. If no, reductant is not being added for use in the GPF, the entry condition is considered met at 628 and the routine proceeds to confirm other entry conditions. If yes, reductant is being added for use in the GPF, the entry condition is not met at 630 and the GPF health diagnostic routine is not executed at 638.

At 632, the method may determine if the GPF is regenerating. During GPF regeneration, the soot accumulated is reacted with oxygen present in the exhaust gases, decreasing the oxygen concentration post-filter. If the GPF is not regenerating, the entry condition considered met at 634 and the routine proceeds to other entry conditions. If the GPF is regenerating, the entry condition is not met at 636 and the GPF health diagnostic routine is not executed at 638.

The method 500 at 510 may go through the selected entry conditions for the specific system and exit if at least one entry condition is not met. The examples listed in FIG. 6 may be applied to certain systems and other entry conditions may be included or excluded for other specific systems to better enable a constant oxygen concentration.

Figure 7:
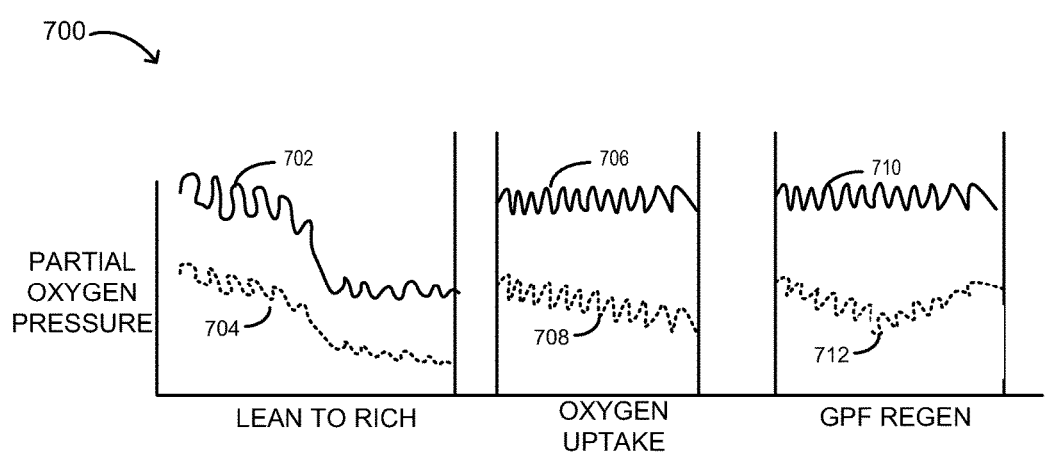
FIG. 7 shows example oxygen sensor output readings for various diagnostic routine entry conditions.

Turning now to FIG. 7, example responses of the pre-filter and post-filter oxygen sensors are illustrated in graph 700 for when the exhaust oxygen concentration through the GPF is not constant.

An example of an entry condition where a GPF test for degradation may not be performed includes transitioning the engine from a lean mode to a rich mode. The oxygen sensor responses of a lean to rich engine transition show each of the pre-filter oxygen sensor partial oxygen pressure output 702 and post-filter oxygen sensor partial oxygen pressure output 704 moving from a higher partial oxygen pressure to a lower partial oxygen pressure. Further, the post-filter oxygen sensor output 704 may experience lag from the pre-filter oxygen sensor output 702. The range of partial pressures encountered during a lean to rich cycle fall outside of the normal fluctuations for an oxygen sensor output and may provide a false indication of GPF leakage if a diagnostic for detecting GPF leakage were performed.

Another example of an entry condition where a GPF test for leakage may not be initiated includes oxygen uptake by soot stored in the GPF. As the soot level increases in the GPF, the oxygen partial pressure differential between the pre-filter oxygen sensor partial oxygen pressure output 706 and post-filter oxygen sensor partial oxygen pressure output 708 will increase. In another example, a washcoat present on the filter may also react with oxygen contained within the exhaust gas, decreasing the oxygen concentration at the post-filter oxygen sensor, causing a decrease in the post-filter oxygen sensor partial oxygen pressure output.

In yet another example, an entry condition where a GPF test for degradation may not be performed includes during regeneration of the GPF. During regeneration of the GPF, oxygen is reacted in the GPF with the soot stored in the filter causing a decrease in the oxygen concentration at the post-filter oxygen sensor output 712. As the soot level appreciably decreases and regeneration of the GPF is completed, the oxygen, no longer being reacted in the GPF, concentration increases at the post-filter oxygen sensor and may cause an increase in the post-filter oxygen partial oxygen pressure output 712. The partial oxygen pressure output at the pre-filter oxygen sensor 710 remains constant during regeneration.

Thus, during each of the conditions shown at FIG. 7, GPF leakage may not be assessed based on the output of the pre-filter and post-filter oxygen sensors outputs since during any of these conditions, a false positive or a false negative result could be generated. By not performing the diagnostic during such conditions, the reliability of the test results is increased.

Turning to FIG. 8, an example method 800 for determining GPF degradation based on the output of exhaust oxygen sensors coupled across a filter is shown. As elaborated above, the output of the exhaust oxygen sensors may be used to infer a pressure drop across the filter during selected conditions when the exhaust oxygen concentration across the filter is substantially constant. Method 800 may be run at 514 of method 500.

At 802, the method may generate a GPF test interval, $\Delta t$. As such, the test interval represents a duration over which the output of the sensors is monitored during the selected entry conditions. In one example, the test interval may be a predefined fixed interval. Further still, the test interval may correspond to a duration that enables a predefined number of data points to be collected from each of the pre-filter oxygen sensor and post-filter oxygen sensor outputs.

At 804, the method may determine the partial oxygen pressure in the exhaust flow over the defined test interval $\Delta t$ at the pre-filter and post-filter oxygen sensors. That is, the controller may collect the output of each of the pre-filter and post-filter oxygen sensors over the duration of the test interval.

At 806, the method may determine an average output of each of the pre-filter and post-filter oxygen sensors outputs for the time interval $\Delta t$. The method includes averaging the pre-filter oxygen sensor values generated over the test interval and averaging post-filter oxygen sensor values generated over a the test interval. It will be appreciated that the average may include a statistical mean, mode, median, weighted average, or other statistically appropriate value.

At 808, the method may determine if the oxygen sensor outputs over the time period $\Delta t$ are within a threshold range. The threshold range may account for normal fluctuations of the oxygen sensors. Further, the method may determine if more than a threshold amount of collected data points lie outside of the threshold range. If the number of outliers is below the threshold amount, that is, most of the collected data points are within the threshold range, the method may proceed to 812. If the number of outliers is higher than the threshold amount, the method may proceed to 810 and discontinue the diagnostic routine due to more than expected fluctuation of sensor outputs. In one example, frequent fluctuation of the sensor outputs to outside the threshold range may indicate a transient change in engine operating conditions from steady state conditions required for entry into the routine. For example, if the system shifts out of a steady state condition during the generated test interval, the oxygen sensor outputs pre-filter and post-filter may change and cause outputs outside of the threshold range. As such, the sensor results cannot be relied on for leak detection and accordingly, during such conditions the routine is aborted.

At 812, the method may determine a correction factor to be applied to the average pre-filter oxygen sensor output. The correction factor may be based on the exhaust flow rate and may be applied to the average pre-filter oxygen sensor output to correct for comparison with the average post-filter oxygen sensor output. In one example, the correction factor may be retrieved from a look-up table in the computer's memory stored as a function of exhaust flow rate.

At 814, the method may apply the determined correction factor to the pre-filter oxygen sensor output. The oxygen sensors measure the partial pressure of oxygen, so the same oxygen concentration will give a higher sensor output before the GPF than after the GPF. By applying a correction factor to the first pre-filter oxygen sensor output average, the output of the first sensor can be compensated for those variations.

At 816, the method may determine a ratio of the corrected average pre-filter oxygen sensor output over the average post-filter oxygen sensor output. For example, for embodiments where the GPF includes no washcoat, a ratio of the corrected average pre-filter oxygen sensor output and the average post-filter oxygen sensor output may be determined.

As such, following correction, the corrected average pre-filter oxygen sensor output should be substantially the same as (e.g., within a threshold difference of) the post-filter oxygen sensor output. Thus, the ratio of the corrected average pre-filter oxygen sensor partial oxygen pressure output over the average post-filter oxygen sensor partial oxygen pressure output may be approximately 1, for example. If the GPF is degraded, for example, substantially damaged or removed, the corrected average pre-filter oxygen sensor partial oxygen pressure output will be overcorrected and be lower than the average post-filter oxygen sensor partial oxygen pressure output, and the resulting ratio may be less than 1. Thus based on the ratio, a health of the GPF may be assessed. In another example, leakage through the filter may be determined based on a ratio of the voltage output of the pre-filter oxygen sensor and the voltage output of the post-filter oxygen sensor being lower than a threshold ratio, wherein the pre-filter oxygen sensor voltage may be corrected.

Accordingly, at 818, the method may compare the determined ratio to a threshold ratio and determine if the ratio is below the threshold ratio. In one example, such as where the GPF does not include a washcoat and the corrected average partial oxygen pressure of the pre-filter oxygen sensor is taken over the average partial oxygen pressure of the post-filter oxygen sensor, the threshold ratio may be set at 1.

If the determined ratio of the average pre-filter oxygen sensor corrected value and the average post-filter oxygen sensor value is lower than the threshold ratio, the method may proceed to 820 and indicate that the GPF is degraded. For example, it may be indicated that the GPF is leaking. Indicating degradation may include setting a diagnostic code. For example, the controller may indicate to a vehicle operator that the GPF needs to be repaired or replaced. If, at 818, the determined ratio is not below the threshold ratio, the method may proceed to 822 and the controller may indicate that the GPF is not leaking and end the test.

In this way method 800 comprises averaging the voltage output of each of the upstream and downstream sensor over an interval, correcting the average voltage output of the upstream sensor and estimating the pressure drop across the filter based on a ratio of the correlated average voltage output of the upstream sensor and the voltage output of the downstream sensor. Correcting the average voltage output of the pre-filter oxygen sensor may include applying a correction factor based on a pressure estimate for an intact GPF in turn based on the exhaust gas flowing through the filter. The method further comprises indicating degradation of the particulate filter based on the pressure drop. In particular, the method indicates leakage across the filter based on the pressure drop being lower than a threshold drop.

Turning to FIG. 9, an alternative method 900 is shown to determine GPF degradation, wherein the pre-filter oxygen sensor output is not corrected. Herein, the uncorrected pre-filter oxygen sensor output may be used in embodiments where the GPF does have a washcoat because of the increased number of reactions in the GPF. Accordingly, a ratio of the uncorrected average pre-filter oxygen sensor output and the average post-filter oxygen sensor output may be determined.

At 902, the method may generate the GPF test interval Δt. As such, the test interval represents a duration over which the output of the sensors is monitored during the selected entry conditions. In one example, the test interval may be a predefined fixed interval. Further still, the test interval may correspond to a duration that enables a predefined number of data points to be collected from each of the pre-filter oxygen sensor and post-filter oxygen sensor outputs.

At 904, the method may determine the partial oxygen pressure in the exhaust flow over the test interval Δt for the pre-filter oxygen sensor and post-filter oxygen sensor.

At 906, the method may determine the average of each of the oxygen sensor outputs for the time period Δt. The method may average the pre-filter oxygen sensor outputs for the test interval and average the post-filter oxygen sensor outputs for the test interval. It will be appreciated that the average may include a statistical mean, mode, median, weighted average, or other statistically appropriate value.

At 908, the method may determine if the pre- and post-filter oxygen sensors outputs over the test interval Δt are within a threshold range. The threshold range may account for normal fluctuations of the oxygen sensors. Further, the method may determine if more than a threshold amount of collected data points lie outside of the threshold range. If the number of outliers is below the threshold amount, that is, most of the collected data points are within the threshold range, the method may proceed to 912. If the number of outliers is higher than the threshold amount, the method may proceed to 910 and discontinue the diagnostic routine due to more than expected fluctuation of sensor outputs. In one example, frequent fluctuation of the sensor outputs to outside the threshold range may indicate a transient change in engine operating conditions from steady state conditions required for entry into the routine. For example, if the system shifts out of a steady state condition during the generated test interval, the oxygen sensor outputs pre-filter and post-filter may change and cause outputs outside of the threshold range. As such, the sensor results cannot be relied on for leak detection and accordingly, during such conditions the routine is aborted.

At 912, the method may determine the difference between the average pre-filter oxygen sensor output and the average post-filter oxygen sensor output.

At 914, the method may determine if the average pre-filter oxygen sensor output minus the average post-filter oxygen sensor output is lower than a threshold difference. The method may compare the voltage output of the pre-filter oxygen sensor averaged over an interval to the voltage output of the post-filter oxygen sensor averaged over the interval. The threshold difference between the pre-filter oxygen sensor and post-filter oxygen sensor outputs may be based on the exhaust flow rate through a functional GPF system. For example, in a GPF with no washcoat, the same oxygen concentration will give a higher partial oxygen pressure output at the pre-filter oxygen sensor than post-filter oxygen sensor. As such, the method comprises indicating degradation when the partial oxygen pressure output at the pre-filter oxygen sensor is not substantially higher than the partial oxygen pressure output at the post-filter oxygen sensor. If yes, at 914, the average pre-filter oxygen sensor output minus the average post-filter oxygen sensor output is lower than a threshold difference the method may proceed to 918 and indicate GPF degradation. If no, at 914, the method may proceed to 916 to indicate that the GPF is not leaking, and then end the diagnostic routine.

In one example, method 900 may be run as part of the routine of FIG. 5, such as at step 514 of method 500. In this way, during selected conditions where a difference in oxygen concentration across an exhaust particulate filter is less than a threshold, comparing of a voltage of a pre-filter exhaust oxygen sensor relative to a voltage output of a post-filter exhaust oxygen sensor to estimate a pressure drop across the filter may be done by a controller. The controller may further indicate leakage through the filter based on this comparison based on a difference between the voltage output of the pre-filter oxygen sensor and the voltage output of the post-filter oxygen sensor being lower than a threshold difference. The pre-filter and post-filter oxygen sensors values may be averaged over an interval. Herein, the controller does not correct the average pre-filter oxygen sensor output and may consequently require less processing power. However, the threshold difference for the average pre-filter oxygen sensor output and the average post-filter oxygen sensor output at various exhaust gas flow rates may be substantially different, so each exhaust gas flow rate may be correlated with a threshold difference stored in the memory of the on-board controller.

Turning to FIG. 10, an example graph 1000 is shown depicting example entry conditions monitored to generate a test interval to determine GPF degradation based on partial oxygen pressure outputs of the pre- and post-filter oxygen sensor. For example, the selected conditions may include each of: the particulate filter regeneration being complete, an exhaust flow rate being higher than a threshold rate, and an absolute exhaust flow rate derivative being lower than a threshold derivative. The entry conditions illustrated in the graph show soot level at plot 1002, exhaust flow rate at plot 1004, exhaust flow rate derivative at plot 1006, and partial oxygen pressure outputs for the pre-filter oxygen sensor at plot 1008 (solid line) and the post-filter oxygen sensor at plot 1010 (dashed line).

During the interval t0 to t1, the soot level (plot 1002) is seen to increase to an amount above a first threshold load (plot 1012). The first threshold load (plot 1012) corresponds to a soot level above which the GPF is full and needs regeneration. As the soot level increases, oxygen in the exhaust gas will be adsorbed, decreasing the post-filter oxygen sensor partial oxygen pressure output (plot 1010) as shown. The exhaust flow rate (plot 1004) is also increasing during t0 to t1. This may be due to acceleration, for example. The exhaust flow rate derivative (plot 1006) illustrates a transient (non-steady state) operating condition. The pre-filter oxygen sensor partial oxygen pressure readings (plot 1008) are seen to increase slightly due to the increase in exhaust flow rate. During this time period, even though the exhaust flow rate is met and is high enough to create nominal pressure at the pre-filter and post-filter oxygen sensors, the entry conditions are not met due to the soot load being above a threshold load and the exhaust flow rate derivative being above a threshold derivative. Therefore, the GPF may not be tested for degradation based on the output of the pre- and post-filter oxygen sensors.

During the interval t1 to t2, the soot level (plot 1002) is high and the difference between the pre-filter oxygen sensor output (plot 1008) and post-filter oxygen sensor output (plot 1010) is above the upper threshold curve. As such, at t1, regeneration of the GPF is initiated. During GPF regeneration, oxygen in the exhaust gas is used to react with the soot particles stored in the GPF. As regeneration occurs, between t1 and t2, the soot level (plot 1002) is seen to decrease. The regeneration may be run for a set time period or until the soot load falls below a second threshold load (plot 1014). The exhaust flow rate (plot 1004) and exhaust flow rate derivative (plot 1006), during t1 to t2, indicate steady state engine operation. The pre-filter oxygen sensor partial oxygen pressure reading (plot 1008) shows a steady output with fluctuations that deviate within permissible margins. The post-filter oxygen sensor partial oxygen pressure reading (plot 1010) shows a decrease in partial oxygen pressure during the GPF regeneration. GPF regeneration is complete when the soot level in the GPF is below the second threshold load (plot 1014) at point 1016. Thus, the partial oxygen pressure at the post-filter oxygen sensor is seen to increase after regeneration is complete at point 1018. During this time period, one entry condition is not met (namely, GPF being regenerated), and therefore the GPF may not be tested for degradation.

During the interval t2 to t3, the soot level (plot 1002) is low, and the exhaust flow rate (plot 1004) and exhaust flow rate derivative (plot 1006) show a steady state operation, indicating a constant oxygen concentration in the exhaust gas. The pre-filter oxygen sensor partial oxygen pressure reading (plot 1008) and post-filter oxygen sensor partial oxygen pressure reading (plot 1010) are steady and show normal fluctuations. The pre-filter oxygen sensor partial oxygen pressure reading is substantially greater than the post-filter oxygen sensor partial oxygen pressure reading. A correction factor applied for this exhaust flow rate to the average pre-filter oxygen sensor outputs may show approximately the same or slightly larger value than the average of the post-filter oxygen sensor outputs, indicating a functional filter.

During the interval t3 to t4 the soot level (plot 1002) is low and the exhaust flow rate (plot 1004) and exhaust flow rate derivative (plot 1006) show a steady state operation, indicating a constant oxygen concentration in the exhaust gas. The pre-filter oxygen sensor partial oxygen pressure reading (plot 1008) and post-filter oxygen sensor partial oxygen pressure reading (plot 1010) are steady and show normal fluctuations. The pre-filter oxygen sensor partial oxygen pressure reading is not substantially greater than the post-filter oxygen sensor partial oxygen pressure reading. In one example, a correction factor applied for this exhaust flow rate to the average pre-filter oxygen sensor outputs may show a value that is lower than the average of the post-filter oxygen sensor outputs and an average ratio may be less than a threshold ratio, indicating degradation of the GPF. For example, during selected conditions where the oxygen concentration is substantially constant through the GPF, the partial oxygen pressure at the pre-filter oxygen sensor is expected to be substantially higher than at the post-filter oxygen sensor. Therefore, applying a correction factor to the pre-filter oxygen sensor output is expected to show approximately the same value as the post-filter oxygen sensor output. However, if the GPF is leaking, the change in the partial oxygen pressure between the pre-filter oxygen sensor and the post-filter oxygen sensor is not substantially different. In another example, based on difference between the pre-filter oxygen sensor output and the post-filter oxygen sensor output being lower than a threshold difference, it may be indicated that the GPF is leaking.

It will be appreciated, that while the depicted example shows three entry conditions to determine if a GPF test interval may be generated and degradation of the GPF diagnose, in alternate examples, additional or fewer entry conditions may be used. Further, the entry conditions may be engine operating parameters which better enable constant oxygen concentration through the GPF.

Turning to FIG. 11, an example method 1100 is shown to regenerate a GPF. As shown in FIG. 3 at data point 5, gage pressure at the pre-filter oxygen sensor is above an upper threshold curve, indicating that the GPF is not functional due to a high soot load and regeneration may be initiated. For example, the method comprises regenerating the GPF when the pre-filter oxygen sensor output is much greater than the post-filter oxygen sensor output.

At 1102, the method may determine the exhaust flow rate.

At 1104, the method may determine the change between the pre-filter oxygen sensor output and the post-filter oxygen sensor output. The method may further apply a correction factor to the pre-filter oxygen sensor output based on the exhaust flow rate at 1102.

At 1106, the method may compare the change determined at 1104 to a threshold change value determined from a lookup table based on the exhaust flow rate determined at 1102. If the change between the oxygen sensors from 1104 is not greater than the threshold change value, the method may proceed to 1108 and no regeneration of the GPF is performed. The method may then end. If the ratio from 1104 is greater than the second threshold value, the method may proceed to 1110 and initiate a method to regenerate the GPF. There are various methods known in the art to regenerate a GPF and one may be chosen based on the specific system. In one example, regenerating the GPF includes increasing the exhaust gas temperature and oxygen concentration in the exhaust gas for a time period to allow for combustion of the soot stored in the GPF.

From 1110, the method may proceed to 1112 and determine the exhaust flow rate.

At 1114, the method may determine the change between the pre-filter oxygen sensor output and the post-filter oxygen sensor output. The method may further apply a correction factor to the pre-filter oxygen sensor output based on the exhaust flow rate at 1110.

At 1116, the method may compare the change determined at 1114 to a threshold change value determine from a lookup table based on the exhaust flow rate determined at 1112. If the ratio at 1114 is greater than the second threshold value, the method may proceed to 1118 and indicate that the GPF regeneration failed. If at 1116 the change is not greater than the second threshold change, the method may proceed to 1120 to indicate that regeneration of the GPF is complete. The method may then end.

In this way, the voltage output of existing exhaust gas oxygen sensors may be correlated with a pressure drop across an exhaust particulate filter during selected conditions, wherein the oxygen concentration is substantially constant. Further, the voltage output of the exhaust gas oxygen sensors may be correlated with a change in exhaust oxygen concentration across the filter when selected conditions are not met. This allows for oxygen sensors already present in the exhaust system to be used for both exhaust gas oxygen sensing and pressure sensing, reducing the need for other sensors, such as a dedicated pressure sensors or temperature sensors for performing diagnostic routines. During selected conditions, when the exhaust gas oxygen concentration is substantially constant, the oxygen sensor may be advantageously used as a pressure sensor and a pressure drop across the filter may be inferred from oxygen sensor output. The pressure drop estimated by the oxygen sensors can then be used to determine filter health. Overall, filter diagnostics can be simplified and exhaust emissions can be improved.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
   during selected conditions, correlating an output of an upstream exhaust oxygen sensor and a downstream exhaust oxygen sensor with a pressure drop across an exhaust particulate filter;
   wherein during the selected conditions, an exhaust oxygen concentration across the particulate filter is substantially constant;
   wherein the selected conditions include each of particulate filter load being less than a threshold load, exhaust flow rate being higher than a threshold rate, and the engine being in steady-state operating conditions; and
   wherein the output is a voltage output, and wherein the correlating includes,
      averaging the voltage output of each of the upstream and downstream sensors over an interval;
      correcting the average voltage output of the upstream sensor based on a pressure estimate for an intact GPF, in turn based on the exhaust flow rate; and
      estimating the pressure drop across the filter based on a ratio of the correlated average voltage output of the upstream sensor and the voltage output of the downstream sensor and indicating degradation of the particulate filter based on the pressure drop.

2. The method of claim 1, wherein the indicating includes indicating leakage of the particulate filter based on the pressure drop being lower than a threshold drop.

3. A method for an exhaust system comprising:
   responsive to determining that selected conditions for a difference in oxygen concentration across an exhaust particulate filter to be less than a threshold exist, and only while the selected conditions are determined to exist, executing a diagnostic routine that includes:
comparing a voltage output of a pre-filter exhaust oxygen sensor and a post-filter exhaust oxygen sensor,
estimating a pressure drop across the filter based on the comparison of the voltage output of the pre-filter exhaust oxygen sensor and the post-filter exhaust oxygen sensor, and
indicating leakage through the filter based on the estimated pressure drop.

4. The method of claim 3, wherein indicating leakage based on the estimated pressure drop includes indicating leakage through the filter based on a difference between the voltage output of the pre-filter oxygen sensor and the voltage output of the post-filter oxygen sensor being lower than a threshold difference.

5. The method of claim 3, wherein indicating leakage based on the estimated pressure drop includes indicating leakage through the filter based on a ratio of the voltage output of the pre-filter oxygen sensor and the voltage output of the post-filter oxygen sensor being lower than a threshold ratio.

6. The method of claim 3, wherein each of the pre-filter oxygen sensor and the post-filter oxygen sensor is one of an EGO, an UEGO, and a HEGO.

7. The method of claim 3, wherein the indicating includes setting a diagnostic code.

8. The method of claim 3, further comprising indicating that the filter is not leaking when a difference between the voltage output of the pre-filter oxygen sensor and the voltage output of the post-filter oxygen sensor is not lower than a threshold difference.

9. The method of claim 3, further comprising not executing the diagnostic routine responsive to determining that the selected conditions for the difference in oxygen concentration across the filter to be less than the threshold do not exist.

10. The method of claim 3, wherein the comparing includes comparing the voltage output of the pre-filter oxygen sensor averaged over an interval to the voltage output of the post-filter oxygen sensor averaged over the interval.

11. The method of claim 10, wherein the comparing further includes correcting the average voltage output of the pre-filter oxygen sensor with a correction factor based on an estimate of the pressure drop over an intact GPF, in turn based on exhaust gas flowing through the filter.

12. An engine exhaust system, comprising:
a gasoline particulate filter positioned downstream of an exhaust catalyst;
a first exhaust gas oxygen sensor positioned upstream of the filter;
a second exhaust gas oxygen sensor positioned downstream of the filter; and
a controller with computer readable instructions stored on non-transitory memory for:
operating in a first mode wherein a voltage output of the first sensor relative to the second sensor is only correlated with a change in exhaust oxygen concentration across the filter; and
operating in a second mode wherein the voltage output of the first sensor relative to the second sensor is only correlated with a change in exhaust pressure across the filter, and indicating a leakage of particulate matter from the gasoline particulate filter based on the change in exhaust pressure across the filter;
wherein the controller is configured to operate in the first mode during a first condition when an exhaust flow rate is less than a threshold, and wherein the controller is configured to operate in the second mode during a second condition when the exhaust flow rate is greater than the threshold.

13. The system of claim 12, wherein the controller includes further instructions for:
while operating in the first mode, indicating accumulation of particulate matter in the filter based on the change in exhaust oxygen concentration across the filter being higher than a threshold; and
indicating the leakage of particulate matter from the filter based on the change in exhaust pressure across the filter being lower than a threshold.

14. The system of claim 12, wherein during the first condition, particulate load of the filter is more than a threshold load, and wherein during the second condition, the particulate load of the filter is less than the threshold load, the particulate load determined using an open loop model.

15. The system of claim 14, wherein the voltage output of the first sensor is indicative of a pre-filter partial pressure of exhaust oxygen and the voltage output of the second sensor is indicative of a post-filter partial pressure of exhaust oxygen, and wherein during the second mode, the output of the first sensor is corrected with a correction factor based on exhaust flow rate.

16. The system of claim 15, wherein during the first mode, the change in exhaust oxygen concentration is correlated with a difference between pre-filter oxygen partial pressure and post-filter oxygen partial pressure, and wherein during the second mode, the change in exhaust pressure across the filter is correlated with a difference between the corrected pre-filter oxygen partial pressure and post-filter oxygen partial pressure.

* * * * *